D. L. CHANDLER & J. H. TRAYNE.
LIGHTING DEVICE.
APPLICATION FILED JUNE 28, 1915.

1,191,946.

Patented July 25, 1916.

Inventors:
Daniel L. Chandler
John H. Trayne
by their attorney

UNITED STATES PATENT OFFICE.

DANIEL L. CHANDLER, OF AYER, AND JOHN H. TRAYNE, OF GROTON, MASSACHUSETTS, ASSIGNORS TO CHANTRAY MFG. CO., A CORPORATION OF MAINE.

LIGHTING DEVICE.

1,191,946.   Specification of Letters Patent.   Patented July 25, 1916.

Application filed June 28, 1915. Serial No. 36,654.

*To all whom it may concern:*

Be it known that we, DANIEL L. CHANDLER and JOHN H. TRAYNE, citizens of the United States, residing, respectively, at Ayer and Groton, in the county of Middlesex and State of Massachusetts, have invented new and useful Improvements in Lighting Devices, of which the following is a specification.

The invention relates to an improved form of lighting device, the same being especially constructed and arranged for use in connection with ignitible pellets.

The object of the invention is to provide an inexpensive, compact and simple lighter having a receptacle constructed and arranged to contain a plurality of ignitible pellets and a suitable instrument for removing the pellets one at a time from said receptacle.

The invention consists in the combination and arrangement of parts set forth in the following specification and particularly pointed out in the claims.

Figure 1:
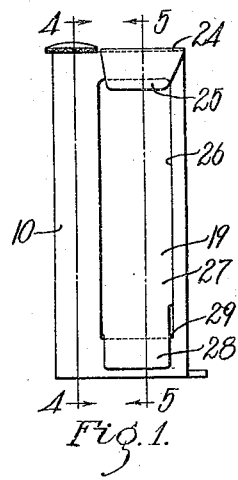
Figure 3:
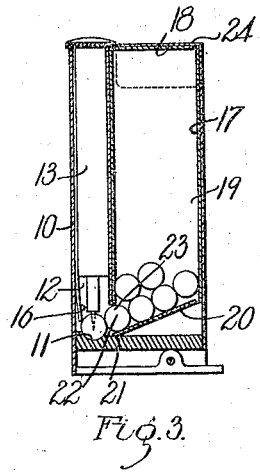
Figure 4:
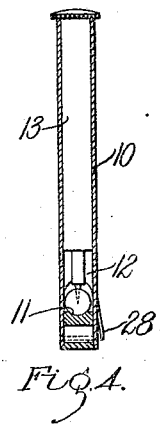
Figure 6:
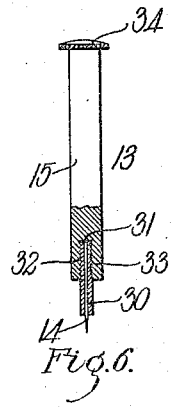
Figure 5:
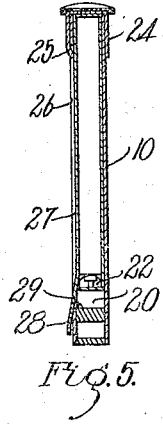
Figure 2:
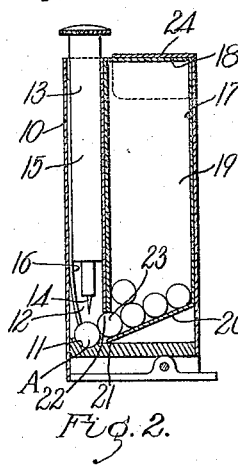
Figure 8:
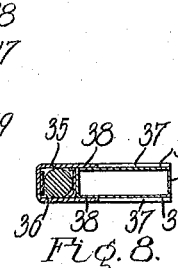
Figure 7:
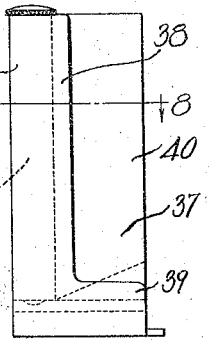

Referring to the drawings: Figure 1 is a side elevation of a lighter embodying our invention. Fig. 2 is a vertical section, partly in elevation, of the device illustrated in Fig. 1. Fig. 3 is a section similar to Fig. 2 with a needle for removing the pellets one at a time piercing one of said pellets. Fig. 4 is a section taken on the line 4—4 of Fig. 1. Fig. 5 is a transverse vertical section taken on the line 5—5 of Fig. 1. Fig. 6 is a detail view of the needle and holder therefor illustrating the manner in which said needle is detachably secured to said holder. Fig. 7 illustrates a modified form of lighter. Fig. 8 is a transverse section taken on the line 8—8 of Fig. 7.

Like numerals refer to like parts throughout the several views of the drawings.

In the drawings, 10 is a casing having at its lower end a concave pocket 11 constructed and arranged to contain a single ignitible pellet, said pellets being indicated at "A", see Fig. 2. The pellet "A" is constructed of an ignitible substance and provided with a coating constructed and arranged to be ignited by contact with an abrasive surface. The casing 10 has a compartment 12 formed therein in communication with the pocket 11, said compartment being constructed and arranged to contain a pointed instrument 13. Said instrument preferably embodies in its construction a needle 14 mounted in a suitable holder 15 with the point of said needle arranged central with respect to the pocket 11, or at least with the pellet "A" contained within said pocket. The instrument 13 is also constructed and arranged to be reciprocated in said compartment toward and from the pellet contained within said pocket for the purpose of piercing said pellet sufficiently to secure the same on said needle, whereby the same may be withdrawn from the pocket by the removal of said instrument or needle from the compartment 12. Means are provided for positioning and holding the pellet within the center of the pocket 11 to guard against the displacement of said pellet in case the casing 10 is tipped or inverted. Said means preferably consists of a resilient member or spring 16 arranged within the compartment 12 in contact with the holder 15 in such a manner that as said holder is inserted in the compartment 12 said spring will be flattened, but as said holder is removed from the compartment 12 said spring will be deflected until the end thereof engages the pellet within the pocket and retains the same in its proper location.

The casing 10 is preferably provided with a second compartment 17 having an opening 18 at its upper end through which may be inserted a receptacle 19 constructed and arranged to contain a plurality of ignitible pellets. The bottom 20 of the receptacle 19 is preferably inclined and when arranged in said compartment 17 the base 21 of said inclined bottom is arranged adjacent to an opening 22, which opening provides communication between the compartments 12 and 17. The receptacle 19 is also provided with a discharge orifice 23 preferably of a size to permit one of said pellets at a time to pass from said receptacle into said pocket 11. Said receptacle 19 is detachably arranged in said compartment 17 so that when the supply of pellets therein has become exhausted said receptacle may be removed and refilled. Furthermore said receptacle is preferably entirely closed with the exception of the discharge orifice 23 and it is through this orifice that said receptacle may again be refilled with a new charge of pellets.

After the receptacle 17 has been inserted in the casing 10 a clip 24, preferably U- shaped, is slipped over the opening 18 to close the same and retain said receptacle within the compartment 17. One of the sides of said U-shaped clip is bent inwardly at 25, said bent portion entering an opening or recess 26 formed in the side of the casing and more firmly secures said clip in place on the casing.

The opening 26 preferably extends the greater portion of the length of the casing 10 and exposes one side 27 of the receptacle 19 and for convenience the exposed side of said receptacle is covered or provided with an abrasive substance which is especially adapted for igniting the pellets "A," when the same are moved along said abrasive surface. The side 27 of said receptacle is extended at its lower end at 28 and slightly bent outwardly so that as said receptacle is inserted within the compartment 17 said extension 28 will project through the opening 26 for the purpose of concealing or covering the lower end 29 of the opening 26, thus removing any obstructions to the pellet when the same is moved from the upper end downwardly along the abrasive side 27 of said receptacle.

The pointed instrument 13, as hereinbefore stated, embodies in its construction a needle 14 and a holder 15. The needle 14 is however preferably detachably secured to the holder 15, an ordinary pin being preferable, which pin is arranged within a tube 30 with the point protruding slightly beyond one end of said tube while the head 31 of said pin engages the opposite end of said tube. The end of the tube adjacent said head is preferably screwthreaded at 32. The holder 15 is provided with a recess 33 at one end thereof within which are screwthreads adapted to be engaged by the screwthreads 32 of said tube and as said tube is screwed into said recess the head 31 of the pin engages the holder 15 constituting the end of said recess and firmly positions and holds said pin within said holder. The end of the holder 15 opposite the recess 33 is slightly enlarger at 34 and knurled to permit said holder to be more firmly held during the removal of said holder from and the insertion thereof into the compartment 12.

In Figs. 7 and 8, which illustrate a modified form of casing, 35 represents the casing which embodies in its construction a compartment 36, similar to the compartment 12 of the form illustrated in the preceding figures. The compartment 17 of said preceding form is omitted in the modified form by cutting away the side wall of said casing at 37, but leaving flanges 38 extending lengthwise of the compartment 36, while another pair of flanges 39 extend at right angles to the flanges 38 at the bottom of the casing 35. Said flanges 38 and 39 constitute means for securing a receptacle 40, which is constructed substantially as shown in Figs. 2 and 3, with the discharge orifice thereof in alinement with the opening into the pocket 11, thus saving metal and lightening the holder.

The operation of the device is as follows: Referring particularly to the preferred form, the receptacle 19 having been filled with ignitible pellets is inserted in the compartment 17 and as the device is tipped upright one of the pellets "A" will be forced downwardly by the weight of the mass of pellets in the receptacle, into the pocket 11 where it will be centrally located by said pocket and prevented from rolling along the compartment 12, provided the casing is inverted, by the spring 16, which spring at this time projects part way across the compartment 12 above said pellet "A." The needle 14 is then pressed downwardly into the pellet "A" as far as the tube 30 will permit. During the insertion of the needle and holder in the compartment 12 the holder 15 of said needle engages the resilient member or spring 16 and causes the same to be bent outwardly away from the pellet which it has previously held in position, thus leaving said pellet free. The holder 13 may then be withdrawn from the compartment 12 carrying with it the pellet which has been pierced by the needle thereof, permitting the next pellet from the receptacle 19 to drop into the pocket 11 beneath the end of the spring 16.

To ignite the pellet carried by the needle 14 said pellet is moved along in contact with the abrasive surface of the side 27 until the same ignites and when the entire substance of the pellet has been consumed, the ashes thereof may be removed from the needle 14 by inserting said needle into a compartment 41 formed at the end of said casing 10. A pivoted cover 42 for said compartment may, if desired, be lightly pressed into contact with said needle, when the same is being withdrawn from said compartment 41, to more thoroughly scrape the end of said needle.

Having thus described our invention what we claim and desire by Letters Patent to secure is:

1. In a lighter the combination of a receptacle constructed and arranged to contain ignitible pellets, said receptacle having a discharge orifice adjacent the lower end thereof, a pocket arranged beneath said discharge orifice adapted to receive pellets one at a time from said receptacle, and a needle adapted to be moved toward said pocket to pierce the pellet contained therein and to remove said pellet from said pocket.

2. In a lighter a receptacle constructed and arranged to contain ignitible pellets, said receptacle having an inclined bottom with a discharge orifice located adjacent to the base of said inclined bottom, a needle constructed and arranged to pierce the pellet located adjacent to said discharge orifice and to remove the same therefrom, and a holder for said needle.

3. In combination means for holding a pellet, a pointed instrument adapted to pierce said pellet and remove the same from said holder, said pointed instrument having an enlargement formed at a distance from the pointed end thereof, a tube adapted to surround the body portion of said pointed instrument, a holder having a recess in one end thereof adapted to receive said tube, and means to secure said tube within said holder.

4. In combination a receptacle constructed and arranged to hold pellets, said receptacle having a discharge orifice for said pellets, a pocket arranged beneath said orifice adapted to hold one of said pellets, a needle adapted to pierce the pellet contained in said pocket, means for guiding said needle toward and from said pocket to pierce and remove said pellet therefrom, and means actuated by the movements of said needle adapted to retain the pellet centrally with respect to said pocket.

5. In combination a pocket constructed and arranged to hold a pellet, a pointed instrument adapted to pierce and remove said pellet from said holder, means constructed and arranged to hold and guide said instrument during the piercing and removing operation thereof, and a pellet receptacle detachably secured to said pocket, said receptacle having a discharge orifice communicating with said pocket.

6. In combination a casing, a pocket formed in said casing constructed and arranged to hold one pellet, said casing having a compartment communicating with said pocket, a needle detachably arranged within said compartment, means in said compartment constructed and arranged to position the pellet in said pocket centrally with respect to the point of said needle, and a receptacle constructed and arranged to contain a plurality of pellets detachably connected with said casing, said receptacle having a discharge orifice communicating with said pocket.

7. In combination a casing, a pocket located within said casing constructed and arranged to hold an ignitible pellet, a receptacle constructed and arranged to contain a plurality of said ignitible pellets, detachably secured to said casing, said receptacle having a discharge orifice arranged to communicate with said pocket, said receptacle also having an abrasive surface, and a pointed instrument constructed and arranged to transfer said pellets one at a time from said pocket into contact with said abrasive surface to ignite said pellet.

In testimony whereof we have hereunto set our hands.

DANIEL L. CHANDLER.
JOHN H. TRAYNE.

Copies of this patent may be obtained for five cents each, by addressing the "Commissioner of Patents, Washington, D. C."